Patented Sept. 8, 1925.

1,552,422

UNITED STATES PATENT OFFICE.

CHARLES H. DASHER, OF EAST ORANGE, NEW JERSEY.

TRANSLUCENT FILM.

No Drawing.  Application filed June 8, 1923. Serial No. 644,183.

*To all whom it may concern:*

Be it known that I, CHARLES H. DASHER, a citizen of the United States, and residing at East Orange, in the county of Essex and State of New Jersey, have invented a new and Improved Translucent Film, of which the following specification is a full disclosure.

This invention consists of an improved viscose mixture from which to fabricate films and other related viscose products; as for instance, bottle-capping hoods. Viscose alone forms articles of this character that are transparent, and various mixtures of viscose with other substances are familiar in the art, as for example mixtures of viscose and barium sulphate for producing opaque articles. This invention differs in that the articles produced from this mixture are of the same chemical composition as if made directly from viscose alone. It is their different physical properties that makes them novel and of enhanced commercial value.

I have found that when viscose is mixed with the cellulose regenerated from viscose; said cellulose being in a dry comminuted form or wet, as precipitated from dilute viscose solutions either by the admixture of precipitating agents, or by heating, or by a combination of both methods, and then washing the resulting finely divided precipitate of hydrated cellulose free from impurities, and filtering from the excess wash water, that these viscose mixtures can be used to form films and other articles that are more or less diffusive to light and on which surface effects can be attained varying from extremely rough surfaces to smooth surfaces having a high gloss. These variable effects are attained by varying the proportion of the regenerated cellulose added to the mixture and by varying its state of subdivision.

As an example, I use the wet, finely divided cellulose precipitated as above described, so that the resulting viscose mixture contains comminuted regenerated cellulose and cellulose as newly-made cementing viscose in the proportions of 50% of each, i. e. ranging 15% plus or minus of 50%. The articles produced by the well-known procedure of moulding, coagulating and fixing, desulphurizing, bleaching, softening, etc., with their accompanying washings in water, are of smooth surface with a high gloss and have a pearl-like translucence although they are still highly transparent. Their variation in appearance from similar articles made from viscose alone is slight, but they vary greatly in that the moist articles develop a greatly increased shrinkage in drying and have a greatly increased absorptive power for dyestuffs.

On the contrary, if I use the same proportion of dried viscose film ground to pass a 100 mesh screen, the articles produced from the mixture of this with viscose are no longer transparent but are fully translucent, comparable to the difference in this respect existing between plain glass and ground glass. The surfaces are no longer smooth but roughened, and the articles show the same shrinkage power and absorption for dyestuff as stated in the other example.

These mixtures are particularly valuable for making bottle-capping hoods, because the greater property of shrinkage they possess results in smoother fitting seals than customary where there exist large differences between diameter of lip and diameter of neck, or between these dimensions of stopper, lip and neck. Further, the translucency attained, while concealing stoppers unattractive in appearance, such as a cork stopper, permits of sufficient light transmission to illuminate the seal.

They are also valuable for covering electric light globes, either by dipping the globes in the mixture and thereby forming the film in place or by forming the hood on a proper mould and shrinking the finished film on the globe. The greater property of shrinkage they possess, permits of making close shrink fits around the base of the globe, which in general is much smaller in diameter than the major dimension of the globe over which the moist hood must pass. Also while freely transmitting the light, these films diffuse it sufficiently to conceal the outline of the incandescent filament of the lamp.

These mixtures are also valuable for coating fabrics in imitation of leather, as, when properly colored, the roughened surfaces that can be attained closely imitate the texture of leather.

Films produced from these mixtures are of value for fabricating artificial flowers and leaves, as the texture of these can be closely imitated. For making lamp shades, these films are particularly adapted, as they lend themselves to very ornamental effects in color tones due to their peculiar translucency and surface effects.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention, and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. The herein-described process of making a new composition of matter, consisting in admixing viscose with cellulose regenerated from viscose.

2. The herein-described process of making a new composition of matter, consisting in mixing together about 50% of cellulose as viscose with about 50% of cellulose regenerated from viscose.

3. The herein-described process of making a new composition of matter, consisting in mixing together comminuted cellulose regenerated from viscose with cellulose in the form of cementing viscose.

4. A process of producing cellulose in a state suitable to form films and other articles that are more or less diffusive to light, and on which surface effects can be attained varying from extremely rough surfaces, to surfaces having a high gloss, said process comprising the steps of precipitating cellulose from a dilute viscose solution, then washing the resulting finely divided precipitate of hydrated cellulose free from impurities, and filtering from the excess wash fluid, and mixing about 50% of said cellulose in comminuted form, with about 50% of cellulose in the form of cementing viscose.

5. The herein-described composition of matter, comprising a mixture of cellulose regenerated from viscose with cellulose in the form of cementing viscose.

6. The herein-described composition of matter, comprising a mixture of dried cellulose regenerated from viscose, with cellulose in the form of cementing viscose.

7. The herein-described composition of matter, comprising a mixture of about 50% of cementing viscose with about 50% of ground, dried cellulose regenerated from viscose.

8. The herein-described composition of matter, comprising a mixture of about 50% of dried cellulose regenerated from viscose and ground to pass a 100-mesh screen, with about 50% of cementing viscose.

9. A new article of manufacture consisting of a film comprising a mixture of cellulose regenerated from viscose, with cellulose in the form of cementing viscose.

10. A new article of manufacture comprising a translucent film having a grained surface, said film comprising a mixture of comminuted, dried cellulose regenerated from viscose, with cellulose in the form of cementing viscose.

In witness whereof, I hereunto subscribe my name.

CHARLES H. DASHER.